(12) United States Patent
Lee et al.

(10) Patent No.: US 10,965,426 B2
(45) Date of Patent: *Mar. 30, 2021

(54) METHOD FOR REPORTING CHANNEL STATE IN WIRELESS COMMUNICATION SYSTEM AND APPARATUS THEREFOR

(71) Applicant: LG Electronics Inc., Seoul (KR)

(72) Inventors: Hyunho Lee, Seoul (KR); Suckchel Yang, Seoul (KR); Seungmin Lee, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,203

(22) Filed: Jul. 26, 2019

(65) Prior Publication Data

US 2019/0349171 A1 Nov. 14, 2019

Related U.S. Application Data

(63) Continuation of application No. 15/547,185, filed as application No. PCT/KR2016/001072 on Feb. 1, 2016, now Pat. No. 10,411,861.

(Continued)

(51) Int. Cl.
*H04L 5/00* (2006.01)
*H04L 1/00* (2006.01)
(Continued)

(52) U.S. Cl.
CPC .............. *H04L 5/0053* (2013.01); *H04L 1/00* (2013.01); *H04L 1/0026* (2013.01);
(Continued)

(58) Field of Classification Search
None
See application file for complete search history.

(56) References Cited

U.S. PATENT DOCUMENTS 10,411,861 B2 * 9/2019 Lee ................. H04L 1/0026
2011/0299484 A1 12/2011 Nam et al.
(Continued)

FOREIGN PATENT DOCUMENTS

| CN | 102812658 A | 12/2012 |
| CN | 102934381 A | 2/2013 |

(Continued)

OTHER PUBLICATIONS

R1-124694; 3GPP TSG RAN WG1 Meeting #71, New Orleans, USA, Nov. 12-16, 2012, Huawei, HiSilicon, "Details of multiplexing for aperiodic CSI Feedback," pp. 1-6.

(Continued)

*Primary Examiner* — Kouroush Mohebbi
(74) *Attorney, Agent, or Firm* — Dentons US LLP

(57) ABSTRACT

A method for reporting channel state in a wireless communication system according to one embodiment of the present invention, the method being implemented by a terminal, comprises: a step for receiving an aperiodic channel state information (CSI) reporting request from a base station; and a step for calculating aperiodic CSI corresponding to the aperiodic CSI reporting request and transmitting the calculated aperiodic CSI to the base station via an uplink shared channel, wherein if the number of component carriers or CSI processes for the terminal exceeds a specific value, only uplink control information including the aperiodic CSI can be transmitted through the uplink shared channel under specific conditions.

8 Claims, 6 Drawing Sheets

Related U.S. Application Data

(60) Provisional application No. 62/112,666, filed on Feb. 6, 2015, provisional application No. 62/160,567, filed on May 12, 2015, provisional application No. 62/166,706, filed on May 27, 2015, provisional application No. 62/204,454, filed on Aug. 13, 2015, provisional application No. 62/221,104, filed on Sep. 21, 2015.

(51) Int. Cl.
*H04W 24/10* (2009.01)
*H04W 72/04* (2009.01)

(52) U.S. Cl.
CPC .............. *H04L 1/0027* (2013.01); *H04L 5/00* (2013.01); *H04L 5/001* (2013.01); *H04W 24/10* (2013.01); *H04W 72/042* (2013.01)

(56) References Cited

U.S. PATENT DOCUMENTS

| | | | |
|---|---|---|---|
| 2011/0305161 | A1* | 12/2011 | Ekpenyong .......... H04L 5/0048 370/252 |
| 2013/0286970 | A1 | 10/2013 | Wang et al. |
| 2014/0086174 | A1 | 3/2014 | Young-Han |
| 2015/0029964 | A1 | 1/2015 | Seo et al. |
| 2018/0092149 | A1 | 3/2018 | Davydov |

FOREIGN PATENT DOCUMENTS

| | | |
|---|---|---|
| CN | 103270803 A | 8/2013 |
| CN | 104685916 A | 6/2015 |
| EP | 2658331 A1 | 10/2013 |
| JP | 2014505401 A | 2/2014 |
| JP | 2015-534390 A | 11/2015 |
| KR | 1020130116902 A | 10/2013 |
| KR | 1020150063493 A | 6/2015 |
| WO | 2012083530 A1 | 6/2012 |
| WO | 2012096431 A1 | 7/2012 |
| WO | 2014051378 A1 | 4/2014 |

OTHER PUBLICATIONS

3rd Generation Partnership Project, Technical Specification Group Radio Access Network;Evolved Universal Terrestrial Radio Access (E-UTRA); Physical layer procedures (Release 12), 3GPP TS 36.213 V12.4.0, Dec. 2014 pp. 1-2,74-84,145-147.

R1-124919: 3GPP TSG RAN WG1 Meeting #71, New Orleans, USA, Nov. 12-16, 2012, "Remaining Details of Aperiodic CSI Multiplexing," Samsung, pp. 1-8.

R1-155183: 3GPP TSG-RAN WG1 Meeting 82bis, Malmo, Sweden, Oct. 5-9, 2015, "New Aperiodic CSI reporting mode for wideband PMI/wideband CQI," CATT, pp. 1-2.

R1-161170: 3GPP TSG-RAN WG1 Meeting #84, St Julian's, Malta, Feb. 15-19, 2016, LG Electronics, Ericsson, pp. 1-5.

* cited by examiner

METHOD FOR REPORTING CHANNEL STATE IN WIRELESS COMMUNICATION SYSTEM AND APPARATUS THEREFOR

This application is a continuation of U.S. application Ser. No. 15/547,185 filed on Jul. 28, 2017, which is a National Stage application of International Application No. PCT/KR2016/001072 filed on Feb. 1, 2016, and claims priority to U.S. Provisional Application Nos. 62/112,666 filed on Feb. 6, 2015; 62/160,567 filed on May 12, 2015; 62/166,706 filed on May 27, 2015; 62/204,454 filed on Aug. 13, 2015 and 62/221,104 filed on Sep. 21, 2015, all of which are hereby incorporated by reference in their entireties as if fully set forth herein.

TECHNICAL FIELD

The present invention relates to a wireless communication system, and more particularly, to a method for reporting a channel state in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to suggest a method for reporting a channel state in a wireless communication system and an operation related thereto.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a method for reporting an aperiodic channel state in a wireless communication system according to one embodiment of the present invention, the method performed by a terminal, the method comprises receiving an aperiodic channel state information (CSI) report request from a base station; and computing aperiodic CSI corresponding to the aperiodic CSI report request and transmitting the computed aperiodic CSI to the base station through an uplink shared channel, wherein when the number of component carriers or CSI processes for the terminal exceeds a specific value, uplink control information only including the aperiodic CSI is transmitted through the uplink shared channel under a predefined condition.

Additionally or alternatively, the predefined condition may include a case that downlink control information (DCI) format 0 is used for the aperiodic CSI report request and a modulation and coding scheme field value included in the DCI is 29.

Additionally or alternatively, the predefined condition may include a case that DCI format 4 is used for the aperiodic CSI report request, only one TB is enabled, a modulation and coding scheme field value included in the DCI is 29, and the number of transmission layers is 1.

Additionally or alternatively, the predefined condition may include a case that a field for the aperiodic CSI report request is N bits, the aperiodic CSI report is triggered, and the number of resource blocks is 4 or less, where N may be an integer of 1 or more.

Additionally or alternatively, the predefined condition may include a case that a field for the aperiodic CSI report request is N+1 bits, the aperiodic CSI report is triggered for one serving cell, and the number of resource blocks is 4 or less, where N may be an integer of 1 or more.

Additionally or alternatively, the predefined condition may include a case that a field for the aperiodic CSI report request is N+1 bits and the aperiodic CSI report is triggered for a plurality of cells, where N may be an integer of 1 or more.

Additionally or alternatively, the predefined condition may include a case that a field for the aperiodic CSI report request is N+1 bits, the aperiodic CSI report is triggered for one CSI process and the number of resource blocks is 4 or less, where N may be an integer of 1 or more.

Additionally or alternatively, the predefined condition may include a case that a field for the aperiodic CSI report request is N+1 bits and the aperiodic CSI report is triggered for a plurality of CSI processes, where N may be an integer of 1 or more.

Additionally or alternatively, the predefined condition may include a case that a field for the aperiodic CSI report request is N+1 bits, the aperiodic CSI report is triggered for a plurality of cells or CSI processes, and the number of resource blocks is r or less, where N may be an integer of 1 or more.

Additionally or alternatively, the r may be determined in proportional to a maximum value of the number of all cells or CSI processes configured for the terminal, the number of cells or CSI processes associated with a value indicated by the aperiodic CSI report request, or the number of cells or CSI processes associated with each value of a DCI field for the aperiodic CSI report request.

Additionally or alternatively, the r may be determined dynamically in proportional to the number of cells or CSI processes associated with a value indicated by the aperiodic CSI report request.

Additionally or alternatively, a modulation order for the aperiodic CSI may be determined in accordance with at least one parameter related to DCI for the aperiodic CSI report request.

Additionally or alternatively, the modulation order for the aperiodic CSI may be determined in accordance with a resource size allocated for the uplink shared channel.

Additionally or alternatively, the modulation order for the aperiodic CSI may be determined in accordance with combination of the number of component carriers or CSI processes for the aperiodic CSI and a resource size allocated for the uplink shared channel.

Additionally or alternatively, the modulation order for the aperiodic CSI may be determined in accordance with combination of a size of the aperiodic CSI and a resource size allocated for the uplink shared channel.

Additionally or alternatively, the modulation order for the aperiodic CSI may be determined in accordance with the number of transmission layers included in DCI for the aperiodic CSI report request.

Additionally or alternatively, the modulation order for the aperiodic CSI may be determined in accordance with a format of DCI for the aperiodic CSI report request.

Additionally or alternatively, the modulation order for the aperiodic CSI may be determined in accordance with the number of bits of a field for the aperiodic CSI report request.

Additionally or alternatively, the modulation order for the aperiodic CSI may be determined in accordance with a bit value of a field for the aperiodic CSI report request.

A terminal configured to report an aperiodic channel state in a wireless communication system according to one embodiment of the present invention comprises a radio frequency (RF) unit; and a processor controls the RF unit, wherein the processor receives an aperiodic channel state information (CSI) report request from a base station and compute aperiodic CSI corresponding to the aperiodic CSI report request and transmits the computed aperiodic CSI to the base station through an uplink shared channel, and wherein when the number of component carriers or CSI processes for the terminal exceeds a specific value, uplink control information only including the aperiodic CSI may be transmitted through the uplink shared channel under a predefined condition.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a channel state may efficiently be reported in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
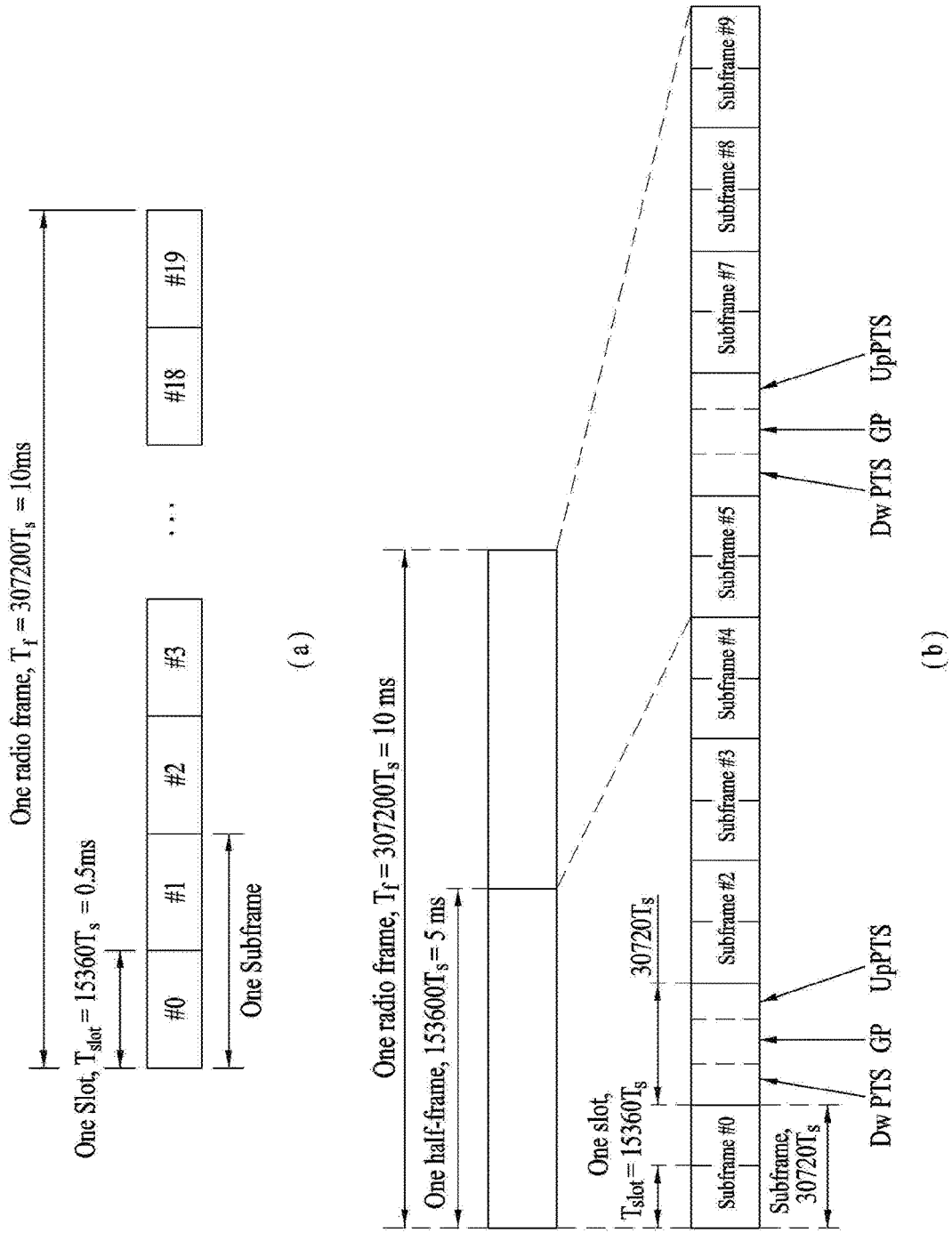
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10ms (307200Ts) and includes 10 subframes in equal size. The 10 subframes in the radio frame may be numbered. Here, Ts denotes sampling time and is represented as Ts=1/(2048*15kHz). Each subframe has a length of 1ms and includes two slots. 20 slots in the radio frame can be sequentially numbered from 0 to 19. Each slot has a length of 0.5ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
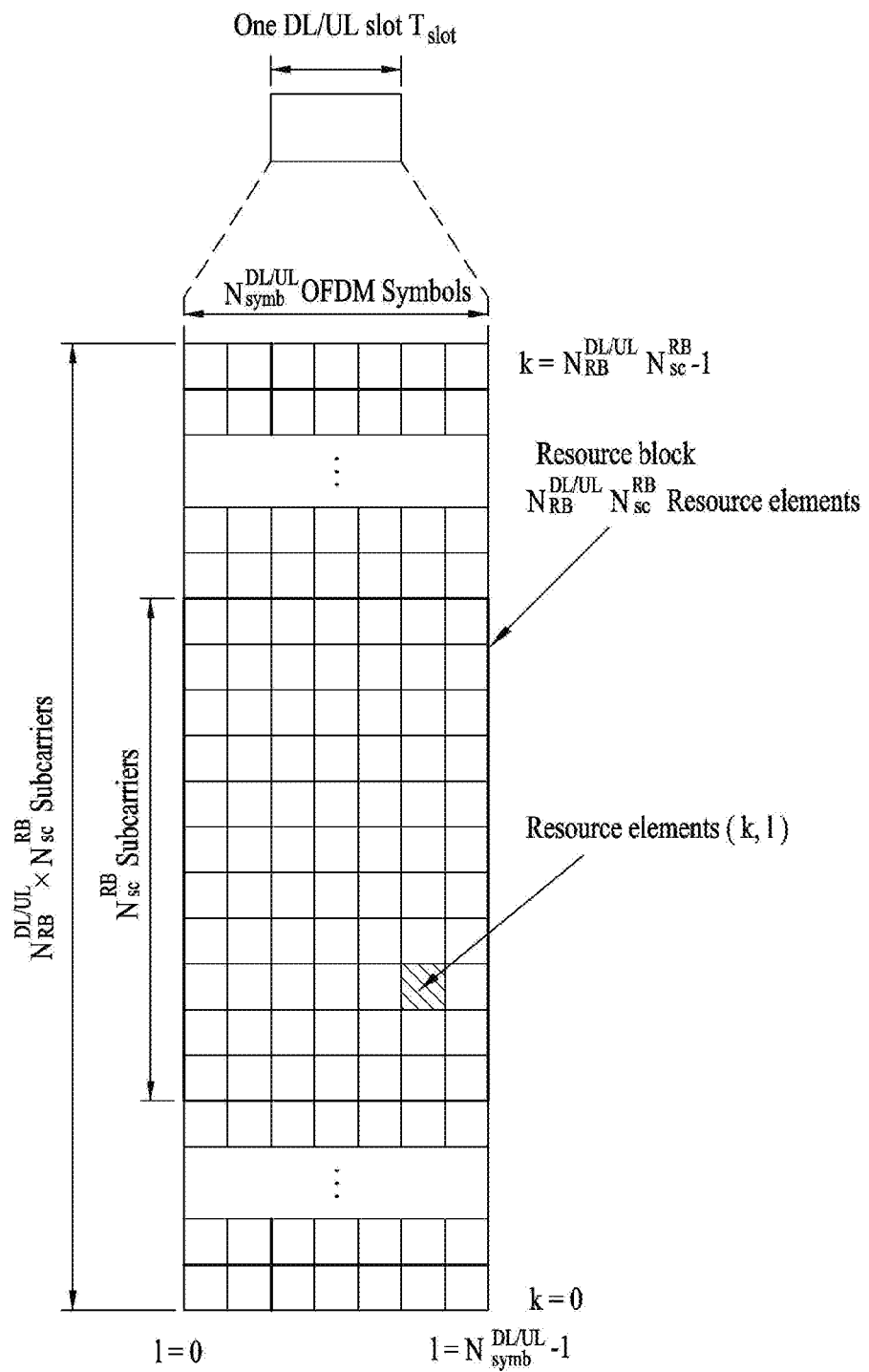
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ element Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

RB

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
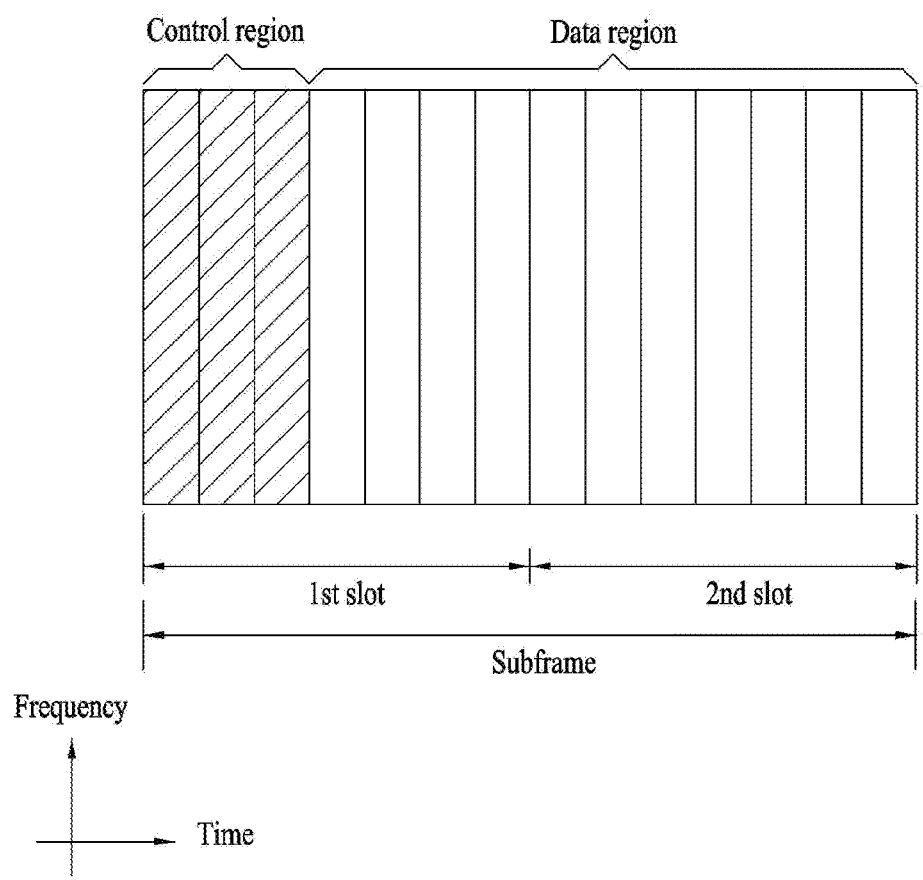
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
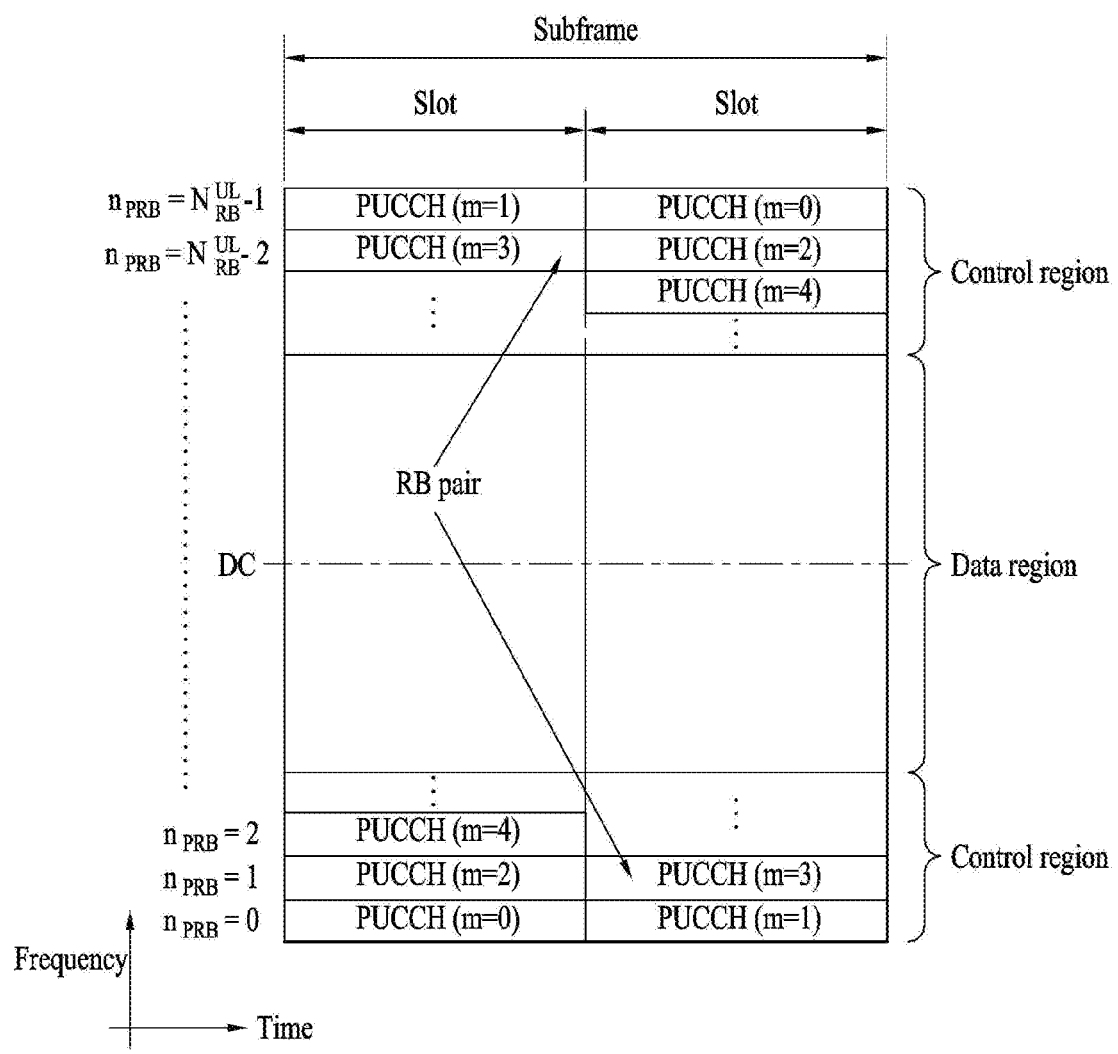
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | PMI Feedback Type | | |
|---|---|---|---|
| | No PMI | Single PMI | Multiple PMIs |
| PUSCH CQI Feedback Type | Wideband (Wideband CQI) | | Mode 1-2 RI 1st wideband CQI(4 bit) 2nd wideband |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | CQI(4 bit)<br>if RI > 1<br>N * Subband PMI(4 bit)<br>(N is the total # of subbands)<br>(if 8Tx Ant,<br>N * subband W2 + wideband W1)<br>Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant,<br>wideband W2 + Best-M W2 + wideband W1) |
| Higher Layer-configured (Subband CQI) | Mode 3-0<br>RI (only for Open-loop SM)<br>1st wideband CQI(4 bit) + N * subband CQI(2 bit) | Mode 3-1<br>RI<br>1st wideband CQI(4 bit) +<br>N * subbandCQI(2 bit)<br>2nd wideband CQI(4 bit) +<br>N * subbandCQI(2 bit)<br>if RI > 1<br>Wideband PMI(4 bit)<br>(if 8Tx Ant,<br>wideband W2 + wideband W1) | Mode 3-2<br>RI<br>1st wideband CQI(4 bit) +<br>N * subbandCQI(2 bit)<br>2nd wideband CQI(4 bit) +<br>N * subbandCQI(2 bit)<br>if RI > 1<br>N * Subband PMI(4 bit)<br>(N is the total # of subbands)<br>(if 8Tx Ant,<br>N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
| --- | --- | --- | --- |
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
| --- | --- |
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
| --- | --- |
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

In a wireless cellular communication system, one base station controls data transmission and reception for a plurality of user equipments (UEs), and scheduling information on downlink data, for example, time/frequency information for data transmission and MCS (modulation and coding scheme) and HARQ (hybrid automatic retransmission request) related information are transmitted to a corresponding UE to allow the UE to receive data. Similarly, the base station notifies the corresponding UE of uplink scheduling information to allow the UE to transmit uplink data. Recently, CA (carrier aggregation) for transmitting downlink data to a single UE by aggregating unit component carrier (CC) has been considered to support a wider bandwidth while using band identification of the related art. Particularly, in the LTE standard, self-carrier scheduling and cross-carrier scheduling have been considered. In the self-carrier scheduling, each of a plurality of CCs transmits a control channel having scheduling information in a state that a plurality of CCs of different duplex modes or the same duplex mode are aggregated. In the cross-carrier scheduling, one of the plurality of CCs transmits a control channel having scheduling information of another CC. In the current LTE standard, CA for transmitting downlink data by aggregating 5 CCs has been considered. However, CA enhancement for transmitting downlink data by aggregating 5 or more CCs (for example, 8 or 16 CCs) is recently considered to support traffic load which is rapidly increased.

In the present invention, in a state that a plurality of CC (component carriers) of different duplex modes or the same duplex mode are aggregated, a method for transmitting aperiodic CSI feedback will be suggested.

Hereinafter, for convenience of description, the suggested method will be described based on the 3GPP LTE system. However, a range of the system to which the suggested method is applied may be applied to another system (for example, UTRA, etc.) in addition to the 3GPP LTE system.

According to the current LTE standard, if the following condition is satisfied, there is no transport block for uplink shared channel (UL-SCH), and the UE transmits only a feedback of uplink control information in a PUSCH reporting mode which is previously set. For convenience of description, UCI (uplink control information) transmission through PUSCH without UL-SCH will be referred to as "UCI only PUSCH feedback".

- ● When DCI format 0 is used, 1_MCS=29 or DCI format 4 is used, only one transport block (TB) is enabled and 1_MCS=29 of the TB, and the number of transmission layer is 1,
  - ■ CSI request bit field is 1 bit, aperiodic CSI report is triggered, and N_PRB is 4 or less,
  - ■ or, CSI request bit field is 2 bits, aperiodic CSI report is triggered for one serving cell, and N_PRB is 4 or less,
  - ■ or, CSI request bit field is 2 bits, aperiodic CSI report is triggered for a plurality of serving cells, and N_PRB is 20 or less,
  - ■ or, CSI request bit field is 2 bits, aperiodic CSI report is triggered for one CSI process, and N_PRB is 4 or less,
  - ■ or, CSI request bit field is 2 bits, aperiodic CSI report is triggered for a plurality of CSI processes, and N_PRB is 20 or less.

First Alternative, Condition for UCI Only PUSCH Feedback

If the number of all CCs/CSI processes configured for the UE is a previously defined value (or value configured through a higher layer signal) or more, or the number (for example, the number of CCs/CSI processes belonging to a first set indicated by a state '01' of Table 8 or Table 9) of CCs/CSI processes associated with a state of an aperiodic CSI request bit within UL grant DCI is a previously defined value (or value configured through a higher layer signal), UCI only PUSCH feedback may be configured when the following conditions are satisfied.

1-1th Condition

When DCI format 0 is used, 1_MCS=29 or DCI format 4 is used, only one transport block (TB) is enabled and 1_MCS=29 of the TB, and the number of transmission layer is 1, ① CSI request bit field is 1 bit, aperiodic CSI report is triggered, and N_PRB is 4 or less, ② or, CSI request bit field is 2 bits, aperiodic CSI report is triggered for one serving cell, and N_PRB is 4 or less, ③ or, CSI request bit field is 2 bits, aperiodic CSI report is triggered for two to five serving cells, and N_PRB is 20 or less, ④ or, CSI request bit field is 2 bits, aperiodic CSI report is triggered for 6 or more serving cells, and N_PRB is 4 or less, ⑤ or, CSI request bit field is 2 bits, aperiodic CSI report is triggered for one CSI process, and N_PRB is 20 or less, ⑥ or, CSI request bit field is 2 bits, aperiodic CSI report is triggered for two to five CSI processes, and N_PRB is 20 or less, ⑦ or, CSI request bit field is 2 bits, and aperiodic CSI report is triggered for 6 or more CSI processes, UCI only PUSCH feedback is configured.

1-2th Condition

When DCI format 0 is used, 1_MCS=29 or DCI format 4 is used, only one transport block (TB) is enabled and 1_MCS=29 of the TB, and the number of transmission layer is 1, ① CSI request bit field is 1 bit, aperiodic CSI report is triggered, and N_PRB is 4 or less, ② or, CSI request bit field is 2 bits, aperiodic CSI report is triggered for one serving cell, and N_PRB is 4 or less, ③ or, CSI request bit field is 2 bits, aperiodic CSI report is triggered for two to five serving cells, and N_PRB is 20 or less, ④ or, CSI request bit field is 2 bits, aperiodic CSI report is triggered for 6 or more serving cells, and N_PRB is r or less, ⑤ or, CSI request bit field is 2 bits, aperiodic CSI report is triggered for one CSI process, and N_PRB is 4 or less.

⑥ or, CSI request bit field is 2 bits, aperiodic CSI report is triggered for two to five CSI processes, and N_PRB is 20 or less, ⑦ or, CSI request bit field is 2 bits, aperiodic CSI report is triggered for 6 or more CSI processes, and N_PRB is r or less, UCI only PUSCH feedback is configured.

1-3th Condition

When DCI format 0 is used, 1_MCS=29 or DCI format 4 is used, only one transport block (TB) is enabled and 1_MCS=29 of the TB, and the number of transmission layer is 1, ① CSI request bit field is 1 bit, aperiodic CSI report is triggered, and N_PRB is 4 or less, ② or, CSI request bit field is 2 bits, aperiodic CSI report is triggered for one serving cell, and N_PRB is 4 or less, ③ or, CSI request bit field is 2 bits, and aperiodic CSI report is triggered for two or more serving cells, ④ or, CSI request bit field is 2 bits, aperiodic CSI report is triggered for one CSI process, and N_PRB is 4 or less, ⑤ or, CSI request bit field is 2 bits, and aperiodic CSI report is triggered for two or more CSI processes, UCI only PUSCH feedback is configured.

In this case, r is a value previously defined or configured through a higher layer, and, for example, may be configured in proportional to a maximum value of the number of all CCs/CSI processes configured for the UE, the number of CCs/CSI processes associated with a specific state of an aperiodic CSI request bit within UL grant DCI, or the number of CCs/CSI processes associated with each state of an aperiodic CSI request bit within UL grant DCI. Alternatively, r may be configured dynamically in proportional to the number of CCs/CSI processes associated with a triggered state.

Second Alternative

As another embodiment, UCI only PUSCH feedback condition may be configured differently for a case that the number of all CCs/CSI processes configured for the UE or the number of CCs/CSI processes associated with a state of an aperiodic CSI request bit within UL grant DCI is a predefined value (or value configured through a higher layer signal) or less and a case that the number of all CCs/CSI or the number of CCs/CSI processes associated with the state exceeds the predefined value.

2-1th Condition

When the number of all CCs/CSI processes configured for the UE or the number of CCs/CSI processes associated with a state of an aperiodic CSI request bit within UL grant DCI is NCC or less, DCI format 0 is used, I_MCS=29 or DCI format 4 is used, 1 transport block (TB) is only enabled, I_MCS=29 of the TB and the number of transmission layer is 1, ① if CSI request bit field is 1 bit, aperiodic CSI report is triggered and N_PRB is 4 or less, ② or, if CSI request bit field is 2 bits, aperiodic CSI report is triggered for one serving cell, and N_PRB is 4 or less, ③ or, if CSI request bit field is 2 bits, aperiodic CSI report is triggered for a plurality of serving cells, and N_PRB is 20 or less, ④ or, if CSI request bit field is 2 bits, aperiodic CSI report is triggered for one CSI process, and N_PRB is 4 or less, ⑤ or, if CSI request bit field is 2 bits, aperiodic CSI report is triggered for a plurality of CSI processes, and N_PRB is 20 or less, UCI only PUSCH feedback is configured.

Alternatively, when the number of all CCs/CSI processes configured for the UE or the number of CCs/CSI processes associated with a state of an aperiodic CSI request bit within UL grant DCI exceeds NCC, DCI format 0 is used, I_MCS=29 or DCI format 4 is used, 1 transport block (TB) is only enabled, I_MCS=29 of the TB and the number of transmission layer is 1, ① if CSI request bit field is 1 bit, aperiodic CSI report is triggered and N_PRB is 4 or less, ② or, if CSI request bit field is 2 bits, aperiodic CSI report is triggered for one serving cell, and N_PRB is 4 or less, ③ or, if CSI request bit field is 2 bits, aperiodic CSI report is triggered for a plurality of serving cells, and N_PRB is 20 or less, ④ or, if CSI request bit field is 2 bits, aperiodic CSI report is triggered for one CSI process, and N_PRB is 4 or less, ⑤ or, if CSI request bit field is 2 bits, and aperiodic CSI report is triggered for a plurality of CSI processes, UCI only PUSCH feedback is configured.

2-2th Condition

When the number of all CCs/CSI processes configured for the UE or the number of CCs/CSI processes associated with a state of an aperiodic CSI request bit within UL grant DCI is NCC or less, DCI format 0 is used, I_MCS=29 or DCI format 4 is used, 1 transport block (TB) is only enabled, I_MCS=29 of the TB and the number of transmitting layers is 1, ① if CSI request bit field is 1 bit, aperiodic CSI report is triggered and N_PRB is 4 or less, ② or, if CSI request bit field is 2 bits, aperiodic CSI report is triggered for one serving cell, and N_PRB is 4 or less, ③ or, if CSI request bit field is 2 bits, aperiodic CSI report is triggered for a plurality of serving cells, and N_PRB is 20 or less, ④ or, if CSI request bit field is 2 bits, aperiodic CSI report is triggered for one CSI process, and N_PRB is 4 or less, ⑤ or, if CSI request bit field is 2 bits, aperiodic CSI report is triggered for a plurality of CSI processes, and N_PRB is 20 or less, UCI only PUSCH feedback is configured.

When the number of all CCs/CSI processes configured for the UE or the number of CCs/CSI processes associated with a state of an aperiodic CSI request bit within UL grant DCI exceeds NCC, DCI format 0 is used, I_MCS=29 or DCI format 4 is used, 1 transport block (TB) is only enabled, I_MCS=29 of the TB and the number of transmission layer is 1, ① if CSI request bit field is 1 bit, aperiodic CSI report is triggered and N_PRB is 4 or less, ② or, if CSI request bit field is 2 bits, aperiodic CSI report is triggered for one serving cell, and N_PRB is 4 or less, ③ or, if CSI request bit field is 2 bits, aperiodic CSI report is triggered for a plurality of serving cells, and N_PRB is r or less, ④ or, if CSI request bit field is 2 bits, aperiodic CSI report is triggered for one CSI process, and N_PRB is 4 or less, ⑤ or, if CSI request bit field is 2 bits, aperiodic CSI report is triggered for a plurality of CSI processes, and N_PRB is r or less, UCI only PUSCH feedback is configured.

In this case, r is a value previously defined or configured through a higher layer, and, for example, may be configured in proportional to a maximum value of the number of all CCs/CSI processes configured for the UE, the number of CCs/CSI processes associated with a specific state of an aperiodic CSI request bit within UL grant DCI, or the number of CCs/CSI processes associated with each state of an aperiodic CSI request bit within UL grant DCI. Alternatively, r may be configured dynamically in proportional to the number of CCs/CSI processes associated with a triggered state.

In the above suggestion, the serving cell may mean (1) a cell configured for the UE, (2) a cell activated at a CSI request timing, or (3) a cell based on an unlicensed band belonging to RRP at a CSI request timing.

Third Alternative

The number of CSI request bits in the first alternative or the second alterative may be replaced with a predefined value (or value set through a higher layer signal) in addition to 1 or 2.

Fourth Alternative

If I_MCS of UL grant DCI is 30 or 31, CSI measurement target CCs or CSI processes of aperiodic CSI may also be configured differently.

If I_MCS of UL grant DCI is 30 or 31, RB condition for configuring UCI only PUSCH feedback may also be defined differently from the existing condition.

Fifth Alternative

If a modulation order in addition to QPSK is accepted for UCI only PUSCH feedback, UCI only transmission condition may be configured differently from the existing condition. For example, if UCI only PUSCH is transmitted by 16QAM, RBs (for example, 2 RBs) smaller than the existing RBs may be configured for a trigger condition.

Sixth Alternative, modulation order for feedback of aperiodic CSI only 6-1th Alternative A modulation order of aperiodic CSI which will be transmitted by UCI only PUSCH feedback may be configured differently by UL grant DCI that includes a trigger of aperiodic CSI. In more detail, a modulation order of aperiodic CSI which will be transmitted by UCI only PUSCH feedback may be configured differently in accordance with a specific MCS index of UL grant DCI (having non-zero RV (redundancy version)) that includes a trigger of aperiodic CSI and/or DMRS cyclic shift (combination). For example, in case of I_MCS=29, a modulation order of PUSCH may be configured by QPSK, and in case of I_MCS=30, a modulation order of PUSCH may be configured by 16 QAM.

6-2th Alternative

A modulation order of aperiodic CSI which will be transmitted by UCI only PUSCH feedback may be configured differently in accordance with resource amount (for example, the number of RBs allocated for PUSCH, or the number of REs). For example, if the number of PUSCH scheduling RBs of aperiodic CSI for a plurality of CCs/CSI processes is N_P or less, a modulation order of aperiodic CSI which will be transmitted by UCI only PUSCH feedback may be configured by 16 QAM, and if the number of PUSCH scheduling RBs of aperiodic CSI for a plurality of CCs/CSI processes exceeds N_P, the modulation order may be configured by QPSK.

6-3th Alternative

A modulation order of aperiodic CSI which will be transmitted by UCI only PUSCH feedback may be configured differently in accordance with combination of the number of CSI measurement target CSI processes/CCs of triggered aperiodic CSI and resource amount (for example, the number of RBs allocated for PUSCH, or the number of available REs) allocated for PUSCH.

6-4th Alternative

A modulation order of aperiodic CSI which will be transmitted by UCI only PUSCH feedback may be configured differently in accordance with combination of feedback amount corresponding to aperiodic CSI and resource amount (for example, the number of RBs allocated for PUSCH, or the number of available REs) allocated for PUSCH.
- ● The modulation order is determined differently depending on a coding rate calculated by combination of maximum CSI feedback amount in the worst case of all RI cases and the allocated PUSCH resource amount.
- ■ It may be considered that the CSI feedback includes RI, and it may be considered that the PUSCH resource includes RI transmission RE.
- ■ In this case, the same modulation order as that of another CSI may be applied to RI.
- ● The modulation order is determined differently depending on a coding rate calculated by combination of CSI feedback amount determined as a result of decoding of RI and the allocated PUSCH resource amount.
- ■ It may be considered that the CSI feedback excludes RI, and it may be considered that the PUSCH resource excludes RI transmission RE.
- ■ In this case, a fixed low specific modulation order (for example, QPSK) may be applied to RI.
- ● It may be considered that the PUSCH resource excludes or includes HARQ-ACK transmission RE. As another method, it may be considered that the PUSCH resource excludes RE corresponding to corresponding HARQ-ACK on the assumption that there is always HARQ-ACK (that is, piggyback) transmission (regardless of the presence of actual transmission) or always includes RE corresponding to HARQ-ACK (regardless of the presence of actual transmission).
- ■ Additionally, a fixed low specific modulation order (for example, QPSK) may be applied to HARQ-ACK, or the same modulation order as that of RI may be applied to HARQ-ACK, or the same modulation order as that of another CSI (excluding RI) may be applied to HARQ-ACK.

6-5th Alternative

A modulation order of aperiodic CSI which will be transmitted by UCI only PUSCH feedback may be configured differently in accordance with the number of transmission layers.

For example, if a field of "precoding information and number of layers" on a received DCI format indicates the number of predefined (or signaled) transmission layers or 'the number of transmission layers' more than the predefined transmission layers, the modulation order of aperiodic CSI which will be transmitted by UCI only PUSCH feedback may be configured differently from the existing case.

For another example, if a field of "precoding information and number of layers" on a received DCI format indicates 'reverse state' (on the current LTE standard), the modulation order of aperiodic CSI which will be transmitted by UCI only PUSCH feedback may be configured differently from the existing case. At this time, for example, TPMI (transmit precoding matrix indicator) information indicated by 'reserved state' and/or information on 'the number of transmission layers' may be notified from an eNB to a UE through predefined signaling, or may previously be scheduled and fixed.

6-6th Alternative

A modulation order of aperiodic CSI which will be transmitted by UCI only PUSCH feedback may be configured differently in accordance with a DCI format of UL grant DCI that includes a trigger of aperiodic CSI.

For another example, the modulation order of aperiodic CSI which will be transmitted by UCI only PUSCH feedback may be configured differently in accordance with combination of DCI format and MCS index of UL grant DCI that includes a trigger of aperiodic CSI, the enable number of transport blocks, and/or 'the number of transmission layers'.

6-7th Alternative

If a large number of cells greater than a predefined (or signaled) threshold value are configured by CA (carrier aggregation) (or if massive CA is configured), a modulation order of aperiodic CSI which will be transmitted by UCI only PUSCH feedback may be configured differently from the existing rule. For example, the corresponding threshold value may be set to 5.

6-8th Alternative

A modulation order of aperiodic CSI which will be transmitted by UCI only PUSCH feedback may be configured differently in accordance with the number of bits of a "CSI request" field on a received DCI format. For example, if the "CSI request" field is 2 bits or less, the modulation order of aperiodic CSI which will be transmitted by UCI only PUSCH feedback may be configured by QPSK, and if the "CSI request" field is 3 bits or more, the modulation order of aperiodic CSI which will be transmitted by UCI only PUSCH feedback may be configured by 16QAM.

6-9th Alternative

A modulation order of (1) aperiodic CSI measurement target (DL) CC or CSI process set and a modulation order of (2) PUSCH may be linked together and configured per state corresponding to a CSI request bit through a higher layer signal (for example, RRC signaling). For example, it is assumed that QPSK is linked to a specific state 'X' and if 16QAM is linked to another specific state 'Y'. If the state 'X' is triggered, the modulation order of aperiodic CSI is configured by QPSK, whereby UCI only PUSCH feedback may be transmitted. If the state 'Y' is triggered, the modulation order of aperiodic CSI is configured by 16QAM, whereby UCI only PUSCH feedback may be transmitted.

In the above all of the schemes, CSI feedback amount may be considered as the number of CSI processes or the number of CSI bits, and the PUSCH resource amount may be considered as the number of RBs or the number of available REs.

6-10th Alternative

In association with the 6-1th alternative, the number of CSI measurement target CCs/CSI processes that may be associated with each state indicated by the CSI request bit may be configured differently in accordance with I_MCS of received UL grant DCI. For example, in case of I_MCS=29, a modulation order of A-CSI only feedback is QPSK, and 10 CCs/CSI processes are associated with each state. On the contrary, in case of I_MCS=30, the modulation order of A-CSI only feedback is 16QAM, and at this time, 5 CCs/CSI processes are associated with each state. However, the above rule may be limited to a case that a certain number of CCs or more are configured for the UE or a certain number of CSI processes or more are configured for the UE.

6-11th Alternative

The number of CSI measurement target CCs/CSI processes that may be associated with each state indicated by the CSI request bit may be configured differently in accordance with a state of "precoding information and number of layers" on a DCI format. However, the above rule may be limited to a case that a certain number of CCs or more are configured for the UE or a certain number of CSI processes or more are configured for the UE.

6-12th Alternative

The number of CSI measurement target CCs/CSI processes that may be associated with each state indicated by the CSI request bit may be configured differently in accordance with a DCI format of UL grant DCI that includes a trigger of aperiodic CSI. However, the above rule may be limited to a case that a certain number of CCs or more are configured for the UE or a certain number of CSI processes or more are configured for the UE.

In all the proposals suggested in the sixth alternative of the present invention, a rule may be determined such that the modulation order of aperiodic CSI which will be transmitted by UCI only PUSCH feedback may be configured differently from the existing case by combination with condition(s) that (1) the number of all CCs/CSI processes configured for the UE is a certain threshold value or more/less or (2) the number of aperiodic CSI measurement target (DL) CCs/CSI processes associated with a specific state of the CSI request bit within UL grant DCI is a certain threshold value or more/less.

In all the proposals of the present invention, (CSI report target) DL CCs/cells and CSI processes may be applied by being mutually replaced with each other.

Seventh Alternative, Modulation Order Per UCI Content (A/N, RI Protection)

If UCI only PUSCH feedback is configured, a modulation order may be configured differently per UCI content by a rule which is previously defined, and may be mapped into UCI RE. In more detail, a UE may perform mapping by always configuring the modulation order for a specific UCI (for example, HARQ-ACK, RI) as QPSK (or specific modulation order which is previously scheduled), and may perform mapping by configuring the modulation order for the other CSI (for example, PMI, CQI) as QPSK or 16QAM (or another modulation order) in accordance with the aforementioned alternative or other scheme.

Alternatively, (1) if the number of all CCs/CSI processes configured for the UE is a certain threshold value or more/less or (2) the number of aperiodic CSI measurement target (DL) CCs/CSI processes associated with a specific state of the CSI request bit within UL grant DCI is a certain threshold value or more/less, and if UCI only PUSCH feedback is configured, the modulation order may be configured differently per UCI content in accordance with a predefined rule as suggested above and may be mapped into UCI RE.

Eighth Alternative, New Interpretation of DCI Field

If the aforementioned condition for UCI only PUSCH feedback according to the current LTE standard is satisfied and therefore UCI only PUSCH feedback is configured, a new data indicator (NDI) field within DCI may previously be defined to indicate a modulation order of UCI content. For example, if UCI only PUSCH feedback is configured and NDI=0, UCI content may be configured as QPSK and if NDI=1, may be configured as 16QAM. Alternatively, if MCS index of corresponding UL grant DCI corresponds to a specific value (for example, I_MCS>=29), the NDI field within DCI may previously be defined to indicate the modulation order of UCI content. Alternatively, (1) if the number of all CCs/CSI processes configured for the UE is a certain threshold value or more/less or (2) the number of aperiodic CSI measurement target (DL) CCs/CSI processes associated with a specific state of the CSI request bit within UL grant DCI is a certain threshold value or more/less, and if UCI only PUSCH feedback is configured, the NDI field may previously be defined to indicate the modulation order of UCI content.

As another method, if the aforementioned condition for UCI only PUSCH feedback according to the current LTE standard is satisfied and therefore UCI only PUSCH feedback is configured, a specific state for aperiodic CSI may be indicated by combination of the NDI field within DCI and the CSI request bit field. Alternatively, if MCS index of corresponding UL grant DCI corresponds to a specific value (for example, I_MCS>=29), the specific state for aperiodic CSI may be indicated by combination of the NDI field within DCI and the CSI request field. Alternatively, (1) if the number of all CCs/CSI processes configured for the UE is a certain threshold value or more/less or (2) the number of aperiodic CSI measurement target (DL) CCs/CSI processes associated with a specific state of the CSI request bit within UL grant DCI is a certain threshold value or more/less, and if UCI only PUSCH feedback is configured, the specific state for aperiodic CSI may be indicated by combination of the NDI field and the CSI request field.

Since the examples of the above-described suggestions may be included as one of the implementation methods of the present invention, it will be apparent that the examples may be regarded as the suggested methods. Also, although the above-described suggestions may be implemented independently, the suggestions may be implemented in the form of combination (or incorporation) of some of the suggested methods. A rule may be defined such that information as to application of the suggested methods (or information on the rules of the suggested methods) may be notified from the eNB to the UE through a predefined signal (e.g., physical layer signal or higher layer signal).

Figure 5:
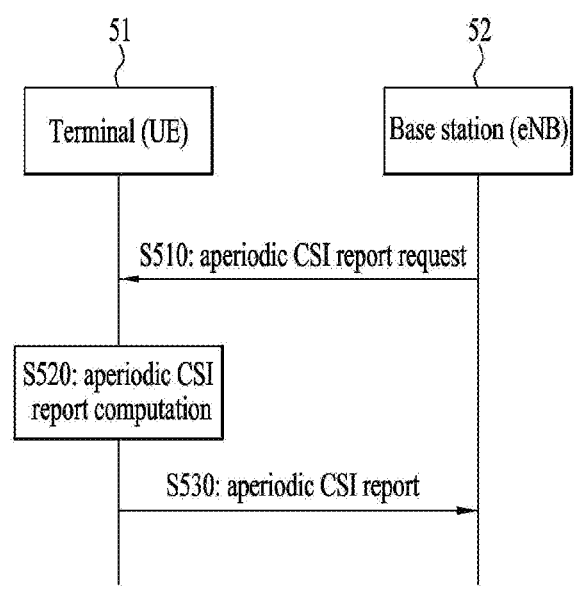
FIG. 5 is a diagram illustrating an operation according to one embodiment of the present invention.

FIG. 5 is a diagram illustrating an operation according to one embodiment of the present invention.

FIG. 5 relates to a method for reporting an aperiodic channel state in a wireless communication system.

The UE 51 may receive an aperiodic CSI (channel state information) report request from the eNB 52 (S510). The UE may compute aperiodic CSI corresponding to the aperiodic CSI report request and transmit the aperiodic CSI to the eNB through an uplink shared channel (S530). In this case, the uplink shared channel may include a physical uplink shared channel If the number of component carriers or CSI processes for the UE exceeds a specific value, only uplink control information that includes the aperiodic CSI may be transmitted through the uplink shared channel under a specific condition. That is, the uplink shared channel may be used to transmit the uplink control information only without uplink data.

The specific condition may include a case that DCI (downlink control information) format 0 is used for the aperiodic CSI report request and a modulation and coding scheme field value included in the DCI is 29.

Or, the specific condition may include a case that DCI format 4 is used for the aperiodic CSI report request, only one TB is enabled, a modulation and coding scheme field value included in the DCI is 29, and the number of transmission layers is 1.

Or, the specific condition may include a case that a field for the aperiodic CSI report request is N bits, the aperiodic CSI report is triggered, and the number of resource blocks is 4 or less.

Or, the specific condition may include a case that a field for the aperiodic CSI report request is N+1 bits, the aperiodic CSI report is triggered for one serving cell, and the number of resource blocks is 4 or less.

Or, the specific condition may include a case that a field for the aperiodic CSI report request is N+1 bits, and the aperiodic CSI report is triggered for a plurality of cells.

Or, the specific condition may include a case that a field for the aperiodic CSI report request is N+1 bits, the aperiodic CSI report is triggered for one CSI process, and the number of resource blocks is 4 or less.

Or, the specific condition may include a case that a field for the aperiodic CSI report request is N+1 bits and the aperiodic CSI report is triggered for a plurality of CSI processes.

Also, a modulation order of the aperiodic CSI may be determined in accordance with at least one parameter related to DCI for the aperiodic CSI report request.

Or, the modulation order of the aperiodic CSI may be determined in accordance with a resource size allocated for the uplink shared channel.

Or, the modulation order of the aperiodic CSI may be determined in accordance with combination of the number of component carriers or CSI processes for the aperiodic CSI and a resource size allocated for the uplink shared channel.

Or, the modulation order of the aperiodic CSI may be determined in accordance with combination of a size of the aperiodic CSI and a resource size allocated for the uplink shared channel.

Or, the modulation order of the aperiodic CSI may be determined in accordance with the number of transmission layers included in DCI for the aperiodic CSI report request.

Or, the modulation order of the aperiodic CSI may be determined in accordance with a format of DCI for the aperiodic CSI report request.

Or, the modulation order of the aperiodic CSI may be determined in accordance with the number of bits of the field for the aperiodic CSI report request.

Or, the modulation order of the aperiodic CSI may be determined in accordance with a bit value of the field for the aperiodic CSI report request.

Although the embodiments according to the present invention have been briefly described with reference to FIG. 5, the embodiment related to FIG. 5 may include at least a part of the aforementioned embodiment(s) alternatively or additionally.

Figure 6:
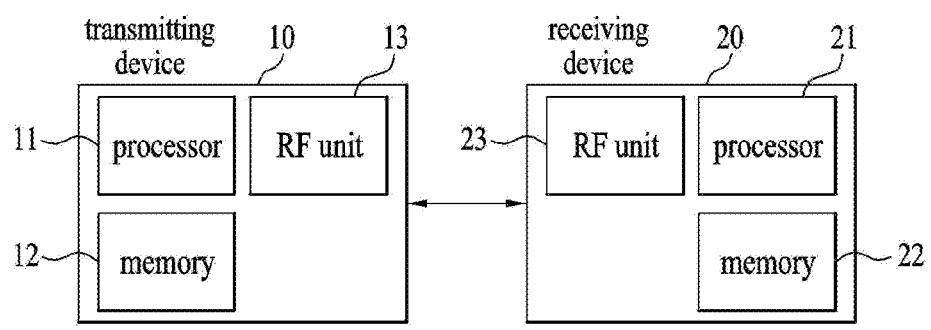
FIG. 6 is a block diagram illustrating an apparatus for implementing the embodiment(s) of the present invention.

FIG. 6 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for transmitting channel state information (CSI) by a user equipment in a wireless communication system, the method comprising:
receiving uplink (UL) grant downlink control information (DCI) regarding a physical uplink shared channel (PUSCH),
wherein the UL grant comprises a CSI request field to trigger an aperiodic CSI report for CSI processes, information regarding a modulation and coding scheme (MCS) index and resource block information regarding the PUSCH; and
transmitting, through the PUSCH based on the UL grant DCI, uplink control information (UCI) comprising the aperiodic CSI report,
wherein only the UCI is transmitted through the PUSCH based on a predetermined condition being satisfied, and
wherein the predetermined condition is:
(i) the UL grant DCI being received in DCI format 0 and the MCS index being 29 or, the UL grant DCI being received in DCI format 4, only 1 transport block (TB) being enabled by the UL grant DCI, the MCS index for the enabled TB being 29, and a number of transmission layers based on the UL grant DCI being 1,
(ii) a number of bits for the CSI request field being a positive integer other than 1 or 2, and
(iii) a number of the CSI processes being equal to or larger than 6.

2. The method of claim 1, wherein only the UCI is transmitted through the PUSCH, irrespective of the number of resource blocks allocated by the resource block information, based on the predetermined condition being satisfied.

3. An apparatus for transmitting channel state information (CSI) in a wireless communication system, the apparatus comprising:
at least one processor; and
at least one computer memory that is operably connectable to the at least one a processor and storing instructions which, when executed, cause the at least one processor to perform operations comprising:
receiving uplink (UL) grant downlink control information (DCI) regarding a physical uplink shared channel (PUSCH),
wherein the UL grant comprises a CSI request field to trigger an aperiodic CSI report for CSI processes, information regarding a modulation and coding scheme (MCS) index and resource block information regarding the PUSCH; and
transmitting, through the PUSCH based on the UL grant DCI, uplink control information (UCI) comprising the aperiodic CSI report,
wherein only the UCI is transmitted through the PUSCH based on a predetermined condition being satisfied, and
wherein the predetermined condition is:
(i) the UL grant DCI being received in DCI format 0 and the MCS index being 29 or, the UL grant DCI being received in DCI format 4, only 1 transport block (TB) being enabled by the UL grant DCI, the MCS index for the enabled TB being 29, and a number of transmission layers based on the UL grant DCI being 1,
(ii) a number of bits for the CSI request field being a positive integer other than 1 or 2, and
(iii) a number of the CSI processes being equal to or larger than 6.

4. The apparatus of claim 3, wherein only the UCI is transmitted through the PUSCH, irrespective of the number of resource blocks allocated by the resource block information, based on the predetermined condition being satisfied.

5. A method for receiving channel state information (CSI) by a base station in a wireless communication system, the method comprising:
transmitting uplink (UL) grant downlink control information (DCI) regarding a physical uplink shared channel (PUSCH),
wherein the UL grant comprises a CSI request field to trigger an aperiodic CSI report for CSI processes, information regarding a modulation and coding scheme (MCS) index and resource block information regarding the PUSCH; and
receiving, through the PUSCH in response to the UL grant DCI, uplink control information (UCI) comprising the aperiodic CSI report,
wherein only the UCI is received through the PUSCH based on a predetermined condition being satisfied, and
wherein the predetermined condition is:
(i) the UL grant DCI being transmitted in DCI format 0 and the MCS index being 29 or, the UL grant DCI being transmitted in DCI format 4, only 1 transport block (TB) being enabled by the UL grant DCI, the MCS index for the enabled TB being 29, and a number of transmission layers based on the UL grant DCI being 1,
(ii) a number of bits for the CSI request field being a positive integer other than 1 or 2, and
(iii) a number of the CSI processes being equal to or larger than 6.

6. The method of claim 5, wherein only the UCI is received through the PUSCH, irrespective of the number of resource blocks allocated by the resource block information, based on the predetermined condition being satisfied.

7. An apparatus for receiving channel state information (CSI) in a wireless communication system, the apparatus comprising:
- at least one processor; and
- at least one computer memory that is operably connectable to the at least one a processor and storing instructions which, when executed, cause the at least one processor to perform operations comprising:
  - transmitting uplink (UL) grant downlink control information (DCI) regarding a physical uplink shared channel (PUSCH),
  - wherein the UL grant comprises a CSI request field to trigger an aperiodic CSI report for CSI processes, information regarding a modulation and coding scheme (MCS) index and resource block information regarding the PUSCH; and
  - receiving, through the PUSCH in response to the UL grant DCI, uplink control information (UCI) comprising the aperiodic CSI report,
  - wherein only the UCI is received through the PUSCH based on a predetermined condition being satisfied, and
  - wherein the predetermined condition is:
    - (i) the UL grant DCI being transmitted in DCI format 0 and the MCS index being 29 or, the UL grant DCI being transmitted in DCI format 4, only 1 transport block (TB) being enabled by the UL grant DCI, the MCS index for the enabled TB being 29, and a number of transmission layers based on the UL grant DCI being 1,
    - (ii) a number of bits for the CSI request field being a positive integer other than 1 or 2, and
    - (iii) a number of the CSI processes being equal to or larger than 6.

8. The apparatus of claim 7, wherein only the UCI is received through the PUSCH, irrespective of the number of resource blocks allocated by the resource block information, based on the predetermined condition being satisfied.

* * * * *